US012634086B2

(12) United States Patent     (10) Patent No.:   US 12,634,086 B2

Guo          (45) Date of Patent:     May 19, 2026

---

(54) METHODS AND APPARATUSES OF DOWNLINK POSITIONING REFERENCE SIGNAL CONFIGURATION

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 365 days.

(21) Appl. No.: 18/368,377

(22) Filed: Sep. 14, 2023

(65) Prior Publication Data

US 2024/0007249 A1     Jan. 4, 2024

Related U.S. Application Data

(63) Continuation of application No. PCT/IB2022/053931, filed on Apr. 28, 2022.

(60) Provisional application No. 63/180,966, filed on Apr. 28, 2021.

(51) Int. Cl.
*H04L 5/00*        (2006.01)

(52) U.S. Cl.
CPC .................................. *H04L 5/0051* (2013.01)

(58) Field of Classification Search
None
See application file for complete search history.

---

(56) References Cited

U.S. PATENT DOCUMENTS

| | | | |
|---|---|---|---|
| 2020/0351813 A1 | 11/2020 | Manolakos | |
| 2021/0006372 A1 | 1/2021 | Cha | |
| 2021/0076359 A1* | 3/2021 | Sosnin | H04W 72/56 |
| 2021/0152410 A1* | 5/2021 | Opshaug | G01S 5/0215 |
| 2021/0250893 A1 | 8/2021 | Manolakos | |
| 2021/0307030 A1 | 9/2021 | Clapp | |
| 2022/0104217 A1 | 3/2022 | Clapp | |
| 2022/0191830 A1* | 6/2022 | Khoryaev | H04L 27/261 |
| 2023/0067569 A1* | 3/2023 | Manolakos | G01S 5/0036 |

FOREIGN PATENT DOCUMENTS

| | | |
|---|---|---|
| CN | 112166575 A | 1/2021 |
| WO | 2020222956 A1 | 11/2020 |

OTHER PUBLICATIONS

First Office Action of the European application No. 22795123.3, issued on Jul. 3, 2025.
First Office Action of the Chinese application No. 202411532370.X, issued on Aug. 19, 2025.

(Continued)

*Primary Examiner* — Diane L Lo

(74) *Attorney, Agent, or Firm* — BAYES PLLC

(57)          ABSTRACT

Methods and systems for downlink (DL) positioning reference signal (PRS) configuration are provided. The method includes receiving, at a terminal device, information for configuring one or more DL PRS resource sets and configurating the terminal device according to the received information for configuring the one or more DL PRS resource sets. Each of the DL PRS resource set includes one or more DL PRS resources, and corresponds to a spatial transmission filter. The spatial transmission filter corresponds to a first value.

20 Claims, 3 Drawing Sheets

300

---

301

Receive, at a terminal device, information for configuring one or more DL PRS resource sets, wherein each of the DL PRS resource set includes one or more DL PRS resources, wherein each of the DL PRS resource set corresponds to a spatial transmission filter, and wherein the spatial transmission filter corresponds to a first value

303

Configure the terminal device according to the received information for configuring the one or more DL PRS resource sets

(56) References Cited

OTHER PUBLICATIONS

International Search Report in the international application No. PCT/IB2022/053931, mailed on Aug. 29, 2022. 3 pages.

Written Opinion of the International Search Authority in the international application No. PCT/IB2022/053931, mailed on Aug. 29, 2022. 3 pages.

3GPP TSG RAN WG1 #100bis R1-2001731, e-Meeting, Apr. 20-30, 2020, Source: OPPO, Title: Remaining Issues on DL Positioning Reference Signal, Agenda Item: 7.2.8.1, Document for: Discussion and Decision. Section 2. 13 pages.

3GPP TSG RAN WG1 #100bis-E R1-2002708, e-Meeting, Apr. 20-30, 2020, Source: Moderator (Intel Corporation), Title: FL Summary #1 for AI 7.2.8.1—DL Reference Signals for NR Positioning, Agenda item: 7.2.8.1, Document for: Discussion and Decision. The whole document. 18 pages.

3GPP TS 37.355 V16.4.0 (Mar. 2021), 3rd Generation Partnership Project; Technical Specification Group Radio Access Network; LTE Positioning Protocol (LPP) (Release 16). Clause 6.4.3. 295 pages.

3GPP TS 38.211 V16.5.0 (Mar. 2021), 3rd Generation Partnership Project; Technical Specification Group Radio Access Network; NR; Physical channels and modulation (Release 16). Clause 7.4.1.7.4. 129 pages.

Fischer Sven: "Chapter 15: 5G NR Positioning: Fundamentals and Standards", In: "5G and Beyond : Fundamentals and Standards", Jan. 1, 2021 (Jan. 1, 2021), Springer International Publishing, Cham, XP055847961, ISBN: 978-3-030-58197-8, pp. 429-483, DOI: 10.1007/978-3-030-58197-8_15, p. 473-p. 477.

Supplementary European Search Report in the European application No. 22795123.3, mailed on Oct. 8, 2024, 13 pages.

* cited by examiner

100

103

105

101

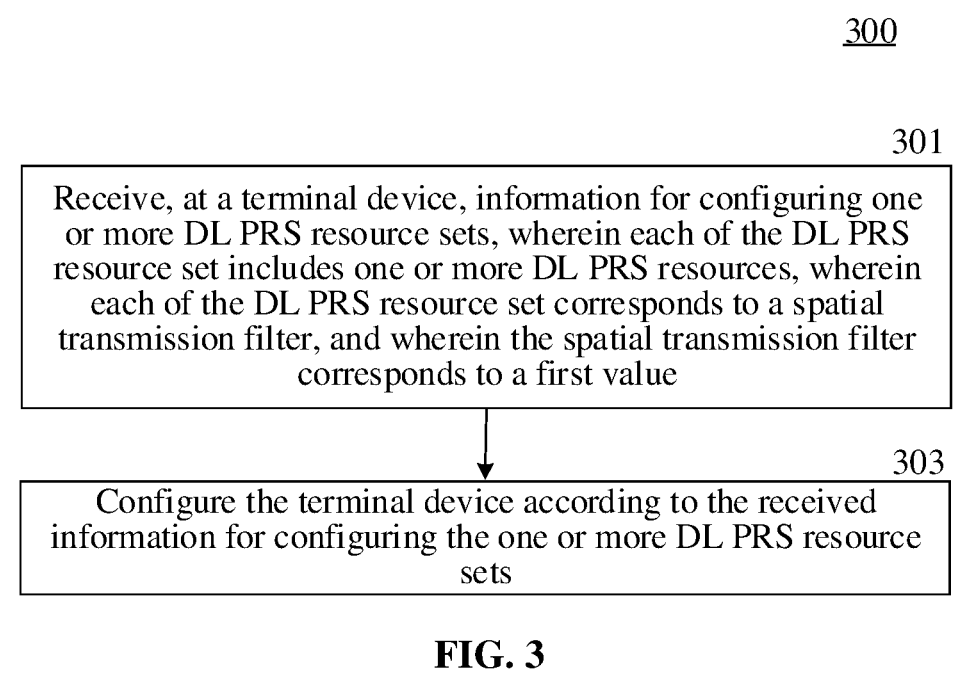

300

301

Receive, at a terminal device, information for configuring one or more DL PRS resource sets, wherein each of the DL PRS resource set includes one or more DL PRS resources, wherein each of the DL PRS resource set corresponds to a spatial transmission filter, and wherein the spatial transmission filter corresponds to a first value

303

Configure the terminal device according to the received information for configuring the one or more DL PRS resource sets

FIG. 3

METHODS AND APPARATUSES OF DOWNLINK POSITIONING REFERENCE SIGNAL CONFIGURATION

CROSS-REFERENCE TO RELATED APPLICATION(S)

This is a continuation application of International Patent Application No. PCT/IB2022/053931, filed on Apr. 28, 2022, entitled "METHODS AND APPARATUSES OF DOWNLINK POSITIONING REFERENCE SIGNAL CONFIGURATION", claiming the benefit of priority to U.S. Provisional Patent Application No. 63/180,966, filed on Apr. 28, 2021, both of which are incorporated herein by reference in their entireties.

BACKGROUND

Rapid growth in computing technology is creating a greater demand for data communication. The increasing demand in turn drives further growth in communication technology, including beam communication or operations. New radio (NR) or 5th generation (5G) communication system supports positioning technology. In 3GPP NR, downlink positioning reference signal (PRS) was introduced to support downlink positioning measurement and Sounding Reference Signal (SRS) for positioning was introduced to support uplink positioning measurement.

NR-based positioning solutions involve user equipment (UE), Transmission/Reception Point) (TRP), and a location server. UE measures downlink (DL) PRS resources sent from multiple different TRPs or transmits SRS resource for positioning. One drawback of the current DL PRS resource configuration and transmission includes that some configuration of the DL PRS periodicity and higher layer parameter of consecutive instances of a DL PRS resource set can go beyond one hyper system frame number (SFN). In such cases, configured PRS resource muting operation cannot be performed. As a result, measurements on the DL PRS resource are negatively impacted and thus the overall performance of positioning is impaired. Therefore, it is advantages to have an improved systems and method to address the foregoing needs.

BRIEF DESCRIPTION OF THE DRAWINGS

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

FIG. 3 is a flowchart of a method in accordance with one or more implementations of the present disclosure.

DETAILED DESCRIPTION

The present disclosure relates to the communications field. The present disclosure is directed to systems and methods for downlink (DL) positioning reference signal (PRS) configuration. More particularly, the present systems and methods can support TRPs with a muting pattern of DL PRS resources that can be beyond a boundary of one hyper system frame number (SFN).

In some embodiments, for a DL PRS resource set, the present system provide a first value as a threshold for the DL PRS resource set. More particularly, the product of a configured periodicity and a configured number of consecutive instances of the DL PRS resource set does not exceed the first value. In some embodiments, the first value can be a function of numerology used by the PRS resource. By this arrangement, the present disclosure provides systems and methods that support TRPs with muting patterns of their DL PRS resources capable of being beyond a boundary of one hyper SFN.

Figure 1:
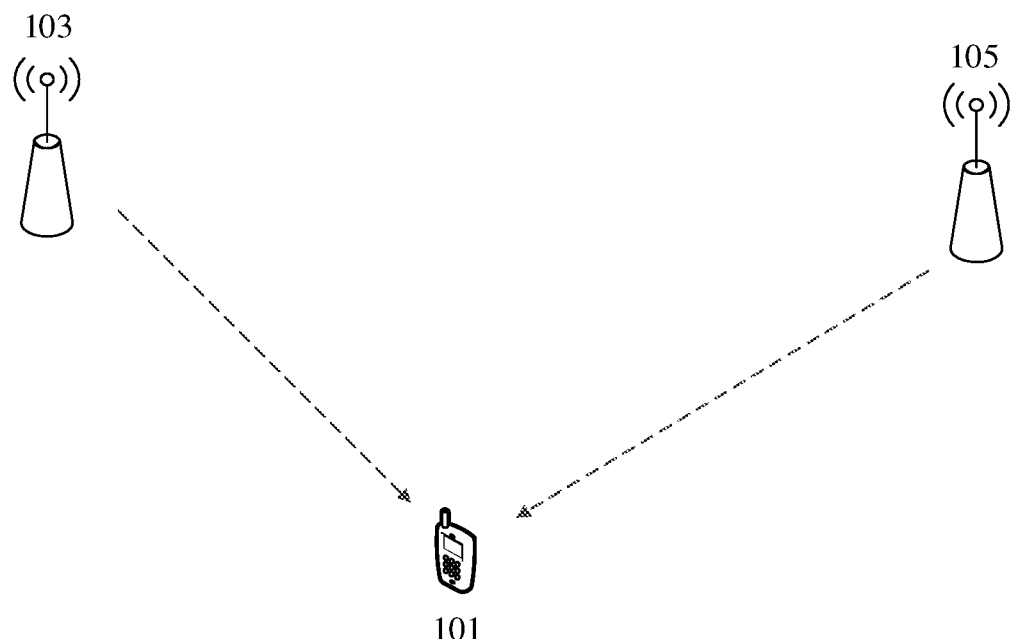
FIG. 1 is a schematic diagram of a wireless communication system in accordance with one or more implementations of the present disclosure.

FIG. 1 is a schematic diagram of a wireless communication system 100 in accordance with one or more implementations of the present disclosure. As shown in FIG. 1, the wireless communications system 100 can be a multi-TRP transmission system that includes one or more TRPs (e.g., a TRP 103 and a TRP 105) that can constitute one or more network nodes/devices (or base stations). Examples of the network node/device include a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP), etc. In some embodiments, the network node/device can include a relay station, an access point, an in-vehicle device, a wearable device, and the like. The network node can include wireless connection devices for communication networks such as: a Global System for Mobile Communications (GSM) network, a Code Division Multiple Access (CDMA) network, a Wideband CDMA (WCDMA) network, an LTE network, a cloud radio access network (Cloud Radio Access Network, CRAN), an Institute of Electrical and Electronics Engineers (IEEE) 802.11-based network (e.g., a Wi-Fi network), an Internet of Things (IoT) network, a device-to-device (D2D) network, a next-generation network (e.g., a 5G network), a future evolved public land mobile network (Public Land Mobile Network, PLMN), or the like. A 5G system or network can be referred to as an NR system or network.

In FIG. 1, the wireless communications system 100 also includes a terminal device 101. The terminal device 101 can be an end-user device configured to facilitate wireless communication. The terminal device 101 can be configured to wirelessly connect to the network node/device (via, e.g., via a wireless channel) according to one or more corresponding communication protocols/standards. The terminal device 101 may be mobile or fixed. The terminal device 101 can be a user equipment (UE), an access terminal, a user unit, a user station, a mobile site, a mobile station, a remote station, a remote terminal, a mobile device, a user terminal, a terminal, a wireless communications device, a user agent, or a user apparatus. Examples of the terminal device 101 include a modem, a cellular phone, a smartphone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, an Internet-of-Things (IoT) device, a device used in a 5G network, a device used in a public land mobile network, or the like. For illustrative purposes, FIG. 1 illustrates only two network nodes/devices (i.e., TRPs 103, 105) and one terminal device 101 in the wireless communications system 100.

However, in some instances, the wireless communications system 100 can include additional network nodes/devices and/or terminal devices.

The terminal device 101 can be configured with one or more DL PRS resource set configurations (e.g., from either one of TRPs 103, 105). Each DL PRS resource set consists of "K" (K≥1) DL PRS resource(s) where each has an associated spatial transmission filter. For each DL PRS resource set, the terminal device 101 can be provided with one or more of the following parameters:

[1] DL PRS resource periodicity. In some embodiments, the periodicity of DL PRS resource "$T_{PRS}$" can be a value in terms of slots. In some embodiments, the periodicity of DL PRS resource "$T_{PRS}$" a value in terms of milliseconds.

[2] DL PRS muting pattern that defines a time location where DL PRS resource is expected to not be transmitted for a DL PRS resource set. In some embodiments, in one method of muting DL PRS resource, each bit in a first bitmap of a muting pattern corresponds to "$N_P$" consecutive instances of a DL PRS resource set (where all the DL PRS resources within the set are muted for the instance that is indicated to be muted). In some embodiments, "$N_P$" can be a configurable value. For example, the length of the first bitmap can be 2, 4, 6, 8, 16, or 32 bits.

To support proper operation of muting on DL PRS resource set, the wireless communications system 100 can implement one or more of the following configurations.

(1) For a DL PRS resource set, the product of the periodicity of DL PRS resource "$T_{PRS}$" and the number of consecutive instances "$N_P$" of a DL PRS resource set is set to be no more than a first value. In other word, the product of $T_{PRS}$ and $N_P$ cannot exceed the first value.

(2) For a DL PRS resource set, the product of "$T_{PRS}/2^\mu$" and "$N_P$" cannot exceed a pre-specified value. In some embodiments, parameter "μ" can be different for different DL PRS spacing. For example, parameter "μ" can be "0, 1, 2, and 3 for "dl-PRS-SubcarrierSpacing=15, 30, 60 and 120 kHz," respectively.

(3) For a DL PRS resource set, the product of "$T_{PRS}$" and "$N_P$" cannot exceed a value "$2^\mu \times Q$." "Q" can be pre-specified value. parameter "μ" can be "0, 1, 2, and 3 for "dl-PRS-SubcarrierSpacing=15, 30, 60 and 120 kHz" respectively.

(4) For a DL PRS resource set, the product of "$T_{PRS}$" and "$N_P$" cannot exceed a value R. "R" can be a function of the number of bits in the first bitmap of a muting pattern.

In some embodiments, the terminal device 101 can be configured with one or more DL PRS resource set configuration(s) as indicated by higher layer parameters "NR-DL-PRS-ResourceSet" and "NR-DL-PRS-Resource" as defined in Clause 6.4.3 of "17, TS 37.355" standard.

In some embodiments, each DL PRS resource set can consist of "K" (K≥1) DL PRS resource(s) where each has an associated spatial transmission filter. The terminal device 101 can be configured with one or more DL PRS positioning frequency layer configuration(s) as indicated by higher layer parameter "NR-DL-PRS-PositioningFrequencyLayer."

For DL PRS resources configured in one frequency layer, the terminal device 101 can be provided with a subcarrier spacing configuration for the DL PRS resources. More particularly, higher layer parameter "dl-PRS-Subcarrier-Spacing" can be used to define the subcarrier spacing for the DL PRS resource. All DL PRS resources and DL PRS resource sets in the same DL PRS positioning frequency layer can have the same value of "dl-PRS-SubcarrierSpacing."

A DL PRS positioning frequency layer can be defined as a collection of DL PRS resource sets which have common parameters configured by "NR-DL-PRS-PositioningFrequencyLayer." A DL PRS resource set can be configured by "NR-DL-PRS-ResourceSet," which consists of one or more DL PRS resources and can be defined by following parameters:

[1] "dl-PRS-Periodicity-and-ResourceSetSlotOffset" can define the DL PRS resource periodicity and take values $$T_{per}^{PRS} \in 2^\mu \{4, 5, 8, 10, 16, 20, 32,$$

$$40, 64, 80, 160, 320, 640, 1280, 2560, 5120, 10240\}$$

slots. In the foregoing embodiments, μ=0, 1, 2, 3 for dl-PRS-SubcarrierSpacing=15, 30, 60 and 120 kHz respectively, with a slot offset for DL PRS resource set with respect to "SFN0 slot 0." All the DL PRS resources within one DL PRS resource set are configured with the same DL PRS resource periodicity.

[2] "dl-PRS-MutingOption1" and "dl-PRS-MutingOption2" can define the time locations where the DL PRS resource is expected to not be transmitted for a DL PRS resource set. If "dl-PRS-MutingOption1" is configured, each bit in the bitmap of "dl-PRS-MutingOption1" corresponds to a configurable number provided by higher layer parameter "dl-prs-MutingBitRepetitionFactor" of consecutive instances of a DL PRS resource set where all the DL PRS resources within the set are muted for the instance that is indicated to be muted. The length of the bitmap can be {2, 4, 6, 8, 16, 32} bits.

If "dl-PRS-MutingOption2" is configured, each bit in the bitmap of dl-PRS-MutingOption2 corresponds to a single repetition index for each of the DL PRS resources within each instance of a "nr-DL-PRS-ResourceSet" and the length of the bitmap is equal to the values of "dl-PRS-ResourceRepetitionFactor."

Both "dl-PRS-MutingOption1" and "dl-PRS-MutingOption2" may be configured at the same time in which case a logical "AND" operation is applied to the bit maps as described in Clause 7.4.1.7.4 of the "4, TS 38.211" standard.

In some embodiments, the DL PRS resource periodicity $$"T_{per}^{PRS}"$$

and the higher layer parameter "dl-prs-MutingBitRepetitionFactor" can be configured by implementing one or more of the following:

[1] In one example, the product of $$T_{per}^{PRS}$$

and higher layer parameter dl-prs-MutingBitRepetitionFactor cannot exceed "$2^\mu \times 1280$" where μ=0, 1, 2, 3 for dl-PRS-SubcarrierSpacing=15, 30, 60 and 120 kHz respectively and the dl-PRS-SubcarrierSpacing is the subcarrier spacing configured for the DL PRS resource.

[2] In another example, the product of $$T_{per}^{PRS}$$

and higher layer parameter dl-prs-MutingBitRepetitionFactor cannot exceed "$2^{\mu} \times B$." Value "B" can be 10240, 5120, 2560, 1280, 640, 320, 160, 80, or 64.

[3] In yet one example, the product of $$T_{per}^{PRS} / 2^{\mu}$$

and higher layer parameter dl-prs-MutingBitRepetitionFactor cannot exceed 1280, where $\mu$=1, 2, 3 for dl-PRS-SubcarrierSpacing=15, 30, 60 and 120 kHz respectively. Parameter "dl-PRS-SubcarrierSpacing" is the subcarrier spacing configured for the DL PRS resource.

[4] In another example, the product of $$T_{per}^{PRS} / 2^{\mu}$$

and higher layer parameter dl-prs-MutingBitRepetitionFactor cannot exceed "C." Value "C" can be 10240, 5120, 2560, 1280, 640, 320, 160, 80, or 64.

In some embodiments, the product of the product of $$T_{per}^{PRS}$$

and higher layer parameter dl-prs-MutingBitRepetitionFactor cannot exceed value "E." Value E is determined based on the number of bits in the bitmap of dl-PRS-MutingOption1. For example, if number of bits in the bitmap of dl-PRS-MutingOption1 is 2, $E=2^{\mu} \times 5120$.

If number of bits in the bitmap of dl-PRS-MutingOption1 is 4, $E=2^{\mu} \times 2560$. If number of bits in the bitmap of dl-PRS-MutingOption1 is 6, $E=2^{\mu} \times 1280$. If number of bits in the bitmap of dl-PRS-MutingOption1 is 8, $E=2^{\mu} \times 1280$. If number of bits in the bitmap of dl-PRS-MutingOption1 is 16, $E=2^{\mu} \times 640$. If number of bits in the bitmap of dl-PRS-MutingOption1 is 32, $E=2^{\mu} \times 320$.

In the foregoing examples, $\mu$=0, 1, 2, 3 for dl-PRS-SubcarrierSpacing=15, 30, 60 and 120 kHz respectively and the dl-PRS-SubcarrierSpacing is the subcarrier spacing configured for the DL PRS resource.

In some embodiments, the product of the product of $$T_{per}^{PRS} / 2^{\mu}$$

and higher layer parameter dl-prs-MutingBitRepetitionFactor cannot exceed value "E." Value E is determined based on the number of bits in the bitmap of dl-PRS-MutingOption1. For example, if number of bits in the bitmap of dl-PRS-MutingOption1 is 2, E=5120. If number of bits in the bitmap of dl-PRS-MutingOption1 is 4, E=2560. If number of bits in the bitmap of dl-PRS-MutingOption1 is 6, E=1280. If number of bits in the bitmap of dl-PRS-MutingOption1 is 8, E=1280. If number of bits in the bitmap of dl-PRS-MutingOption1 is 16, E=640. If number of bits in the bitmap of dl-PRS-MutingOption1 is 32, E=320.

In the foregoing examples, $\mu$=0, 1, 2, 3 for dl-PRS-SubcarrierSpacing=15, 30, 60 and 120 kHz respectively and the dl-PRS-SubcarrierSpacing is the subcarrier spacing configured for the DL PRS resource.

In some embodiments, the terminal device 101 does not expect that the product of $$T_{per}^{PRS} / 2^{\mu}$$

and higher layer parameter dl-prs-MutingBitRepetitionFactor exceeds 1280. In some embodiments, the terminal device 101 does not expect that the product of $$T_{per}^{PRS} / 2^{\mu}$$

and higher layer parameter dl-prs-MutingBitRepetitionFactor exceeds "C" (example values of C include 10240, 5120, 2560, 1280, 640, 320, 160, 80, and 64).

In some embodiments, the terminal device 101 does not expect that the product of the product of $$T_{per}^{PRS}$$

and higher layer parameter dl-prs-MutingBitRepetitionFactor exceeds value "E," where the value of E is determined based on the number of bits in the bitmap of dl-PRS-MutingOption1.

For example, if number of bits in the bitmap of dl-PRS-MutingOption1 is 2, $E=2^{\mu} \times 5120$. If number of bits in the bitmap of dl-PRS-MutingOption1 is 4, $E=2^{\mu} \times 2560$. If number of bits in the bitmap of dl-PRS-MutingOption1 is 6, $E=2^{\mu} \times 1280$. If number of bits in the bitmap of dl-PRS-MutingOption1 is 8, $E=2^{\mu} \times 1280$. If number of bits in the bitmap of dl-PRS-MutingOption1 is 16, $E=2^{\mu} \times 640$. If number of bits in the bitmap of dl-PRS-MutingOption1 is 32, $E=2^{\mu} \times 320$.

In the foregoing examples, $\mu$=0, 1, 2, 3 for dl-PRS-SubcarrierSpacing=15, 30, 60 and 120 kHz respectively and the dl-PRS-SubcarrierSpacing is the subcarrier spacing configured for the DL PRS resource.

In some embodiments, the terminal device 101 does not expect that the product of the product of $$T_{per}^{PRS} / 2^{\mu}$$

and higher layer parameter dl-prs-MutingBitRepetitionFactor exceeds value "E," where the value of E is determined based on the number of bits in the bitmap of dl-PRS-MutingOption1.

For example, if number of bits in the bitmap of dl-PRS-MutingOption1 is 2, E=5120. If number of bits in the bitmap of dl-PRS-MutingOption1 is 4, E=2560. If number of bits in the bitmap of dl-PRS-MutingOption1 is 6, E=1280. If number of bits in the bitmap of dl-PRS-MutingOption1 is 8, E=1280. If number of bits in the bitmap of dl-PRS-MutingOption1 is 16, E=640. If number of bits in the bitmap of dl-PRS-MutingOption1 is 32, E=320.

In the foregoing examples, $\mu$=0, 1, 2, 3 for dl-PRS-SubcarrierSpacing=15, 30, 60 and 120 kHz respectively and the dl-PRS-SubcarrierSpacing is the subcarrier spacing configured for the DL PRS resource.

In some embodiments, the terminal device 101 does not expect that the product of $$T_{per}^{PRS}$$

and higher layer parameter dl-prs-MutingBitRepetitionFactor exceeds $2^{\mu} \times 1280$, where $\mu=0$, 1, 2, 3 for dl-PRS-SubcarrierSpacing=15, 30, 60 and 120 kHz respectively and the dl-PRS-SubcarrierSpacing is the subcarrier spacing configured for the DL PRS resource. In one example, the terminal device 101 does not expect that the product of $$T_{per}^{PRS}$$

and higher layer parameter dl-prs-MutingBitRepetitionFactor exceeds $2^{\mu} \times B$. Value B can be 10240, 5120, 2560, 1280, 640, 320, 160, 80, and 64.

In some embodiments, the DL PRS resource and DL PRS resource set can be defined are defined by enumerating multiple acceptable parameters and values. In some embodiments, limitations on configurating DL PRS resources can also be described by listing multiple acceptable parameters and values for various use cases.

Figure 2:
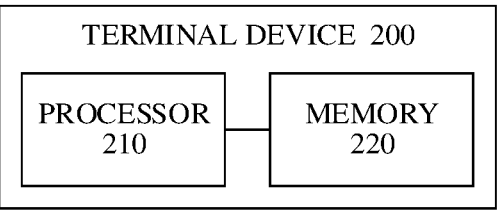
FIG. 2 is a schematic block diagram of a terminal device in accordance with one or more implementations of the present disclosure.

FIG. 2 is a schematic block diagram of a terminal device in accordance with one or more implementations of the present disclosure. FIG. 2 is a schematic block diagram of a terminal device 200 (e.g., an example of the terminal device 101 of FIG. 1) in accordance with one or more implementations of the present disclosure. As shown in FIG. 2, the terminal device 200 includes a processing unit 210 (e.g., a DSP, a CPU, a GPU, etc.) and a memory 220. The processing unit 210 can be configured to implement instructions that correspond to the methods discussed herein and/or other aspects of the implementations described above. The processing unit 210 may also be coupled to a memory 220.

It should be understood that the processor in the implementations of this technology may be an integrated circuit chip and has a signal processing capability. During implementation, the steps in the foregoing method may be implemented by using an integrated logic circuit of hardware in the processor or an instruction in the form of software. The processor may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor may be a microprocessor, or the processor may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory, and the processor reads information in the memory and completes the steps in the foregoing methods in combination with the hardware thereof.

It may be understood that the memory 220 in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type.

FIG. 3 is a flowchart of a method 300 in accordance with one or more implementations of the present disclosure. The method 300 can be implemented by a wireless communications system (e.g., the wireless communications system 100) that includes a terminal device (e.g., the terminal device 101) and a network node/device or gNB (e.g., the TRPs or other suitable network node/device described herein). The method 300 is for At block 301, the method 400 starts by receiving, at a terminal device, information for configuring one or more DL PRS resource sets. In some embodiments, each of the DL PRS resource set includes one or more DL PRS resources. In some embodiments, each of the DL PRS resource set corresponds to a spatial transmission filter. The spatial transmission filter can correspond to a first value or a pre-specified value.

In some embodiments, the received information for configuring the one or more DL PRS resource sets is from a network node. In some embodiments, the network node includes a Transmission/Reception point (TRP). In some embodiments, the network node can be a base station.

In some embodiments, the received information for configuring the one or more DL PRS resource sets includes a DL PRS resource periodicity for each of the one or more DL PRS resource sets. In some embodiments, the DL PRS resource periodicity includes a value indicative of a time slot. In some embodiments, the DL PRS resource periodicity includes a value indicative of time in milliseconds.

In some embodiments, the received information for configuring the one or more DL PRS resource sets includes a DL PRS muting pattern for each of the one or more DL PRS resource sets. The DL PRS muting pattern can indicate a time location where one or more DL PRS resources is expected to not be transmitted for the one or more DL PRS resource sets.

In some embodiments, the DL PRS muting pattern corresponds to a value "$N_P$" which indicates consecutive instances of the one or more DL PRS resources set to be muted. The received information for configuring the one or more DL PRS resource sets can further includes a DL PRS resource periodicity "$T_{PRS}$" for each of the one or more DL PRS resource sets. The product of the DL PRS resource periodicity "$T_{PRS}$" and the value "$N_P$" of each DL PRS resource set can be set to be no more than a first value.

In some embodiments, the first value can be "$2^\mu \times Q$," and "Q" can be a pre-specified value. Parameter "$\mu$" can be one of the following: 0, 1, 2, and 3, each corresponding to different carrier spacing (e.g., "dl-PRS-SubcarrierSpacing=15, 30, 60 and 120 kHz" respectively).

In some embodiments, a product of "$T_{PRS}/2^\mu$" and the value "$N_P$" of each DL PRS resource set is set to be no more than a pre-specified value, and wherein parameter "$\mu$" is one of the following: 0, 1, 2, and 3, each corresponding to different carrier spacing (e.g., "dl-PRS-SubcarrierSpacing=15, 30, 60 and 120 kHz" respectively).

In some embodiments, the first value is determined based on a function of the number of bits in a first bitmap of the DL PRS muting pattern.

At block 303, the method 300 continues by configuring the terminal device according to the received information for configuring the one or more DL PRS resource sets.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

In the Detailed Description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present disclosure. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth herein for purposes of clarity. Moreover, although the following disclosure sets forth several implementations of different aspects of the present disclosure, several other implementations can have different configurations or different components than those described in this section. Accordingly, the disclosed techniques can have other implementations with additional elements or without several of the elements described below.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The term "and/or" in this specification is only an association relationship for describing the associated objects, and indicates that three relationships may exist, for example, A and/or B may indicate the following three cases: A exists separately, both A and B exist, and B exists separately. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the disclosure is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the disclosure are presented below in certain claim forms, the applicant contemplates the various aspects of the disclosure in any number of claim forms. Accordingly, the applicant reserves the right to pursue additional claims after filing this application to pursue such additional claim forms, in either this application or in a continuing application.

The invention claimed is:

1. A method for downlink (DL) positioning reference signal (PRS) configuration, comprising:
   receiving, at a terminal device, information for configuring one or more DL PRS resource sets, wherein each of the DL PRS resource set includes one or more DL PRS resources, wherein each of the DL PRS resource set corresponds to a spatial transmission filter, and wherein the spatial transmission filter corresponds to a first value; and
   configuring the terminal device according to the received information for configuring the one or more DL PRS resource sets,
   wherein the received information for configuring the one or more DL PRS resource sets includes a DL PRS muting pattern for each of the one or more DL PRS resource sets,
   the DL PRS muting pattern corresponds to a value "$N_P$" which indicates consecutive instances of the one or more DL PRS resources set to be muted, and
   the received information for configuring the one or more DL PRS resource sets includes a DL PRS resource periodicity "$T_{PRS}$" for each of the one or more DL PRS resource sets, and a product of the DL PRS resource periodicity "$T_{PRS}$" and the value "$N_P$" of each DL PRS resource set is set to be no more than a first value;
   wherein the first value is "$2^\mu \times Q$," and wherein "Q" is a pre-specified value, and wherein parameter "$\mu$" is one of the following: 0, 1, 2, and 3, or
   the first value is determined based on a function of the number of bits in a first bitmap of the DL PRS muting pattern.

2. The method of claim 1, wherein the received information for configuring the one or more DL PRS resource sets is from a network node.

3. The method of claim 2, wherein the network node includes a Transmission/Reception point (TRP).

4. The method of claim 2, wherein the network node includes a base station.

5. The method of claim 1, wherein the DL PRS resource periodicity includes a value indicative of a time slot.

6. The method of claim 1, wherein the DL PRS resource periodicity includes a value indicative of time in milliseconds.

7. The method of claim 1, wherein the DL PRS muting pattern indicates a time location where one or more DL PRS resources is expected to not be transmitted for the one or more DL PRS resource sets.

8. The method of claim 1, wherein $\mu$=0, 1, 2, 3 for dl-PRS-SubcarrierSpacing=15, 30, 60 and 120 KHz respectively, and the dl-PRS-SubcarrierSpacing is a subcarrier spacing configured for the one or more DL PRS resources.

9. An apparatus, comprising:
   a memory;
   a processor coupled to the memory and configured to:

receive information for configuring one or more DL PRS resource sets, wherein each of the DL PRS resource set includes one or more DL PRS resources, wherein each of the DL PRS resource set corresponds to a spatial transmission filter, and wherein the spatial transmission filter corresponds to a first value; and
   configure the apparatus according to the received information for configuring the one or more DL PRS resource sets,
   wherein the received information for configuring the one or more DL PRS resource sets includes a DL PRS muting pattern for each of the one or more DL PRS resource sets,
   the DL PRS muting pattern corresponds to a value "$N_P$" which indicates consecutive instances of the one or more DL PRS resources set to be muted, and
   the received information for configuring the one or more DL PRS resource sets includes a DL PRS resource periodicity "$T_{PRS}$" for each of the one or more DL PRS resource sets, and a product of the DL PRS resource periodicity "$T_{PRS}$" and the value "$N_P$" of each DL PRS resource set is set to be no more than a first value;
   wherein the first value is "$2^\mu \times Q$," and wherein "Q" is a pre-specified value, and wherein parameter "$\mu$" is one of the following: 0, 1, 2, and 3, or
   the first value is determined based on a function of the number of bits in a first bitmap of the DL PRS muting pattern.

10. The apparatus of claim 9, wherein the received information for configuring the one or more DL PRS resource sets is from a network node.

11. The apparatus of claim 10, wherein the network node includes a Transmission/Reception point (TRP), or the network node includes a base station.

12. The apparatus of claim 9, wherein the DL PRS resource periodicity includes a value indicative of a time slot, or the DL PRS resource periodicity includes a value indicative of time in milliseconds.

13. The apparatus of claim 9, wherein the DL PRS muting pattern indicates a time location where one or more DL PRS resources is expected to not be transmitted for the one or more DL PRS resource sets.

14. The apparatus of claim 9, wherein $\mu$=0, 1, 2, 3 for dl-PRS-SubcarrierSpacing=15, 30, 60 and 120 kHz respectively, and the dl-PRS-SubcarrierSpacing is a subcarrier spacing configured for the one or more DL PRS resources.

15. A system, comprising:
   a terminal device configured to:
      receive information for configuring one or more DL PRS resource sets, wherein each of the DL PRS resource set includes one or more DL PRS resources, wherein each of the DL PRS resource set corresponds to a spatial transmission filter, and wherein the spatial transmission filter corresponds to a first value; and
   configure the terminal device according to the received information for configuring the one or more DL PRS resource sets,
   wherein the received information for configuring the one or more DL PRS resource sets includes a DL PRS muting pattern for each of the one or more DL PRS resource sets,
   the DL PRS muting pattern corresponds to a value "$N_P$" which indicates consecutive instances of the one or more DL PRS resources set to be muted, and the received information for configuring the one or more DL PRS resource sets includes a DL PRS resource periodicity "$T_{PRS}$" for each of the one or more DL PRS resource sets, and a product of the DL PRS resource periodicity "$T_{PRS}$" and the value "$N_P$" of each DL PRS resource set is set to be no more than a first value;

wherein the first value is "$2^\mu \times Q$," and wherein "Q" is a pre-specified value, and wherein parameter "$\mu$" is one of the following: 0, 1, 2, and 3, or the first value is determined based on a function of the number of bits in a first bitmap of the DL PRS muting pattern.

16. The system of claim 15, wherein the received information for configuring the one or more DL PRS resource sets is from a network node.

17. The system of claim 16, wherein the network node includes a Transmission/Reception point (TRP), or the network node includes a base station.

18. The system of claim 15, wherein the DL PRS resource periodicity includes a value indicative of a time slot, or the DL PRS resource periodicity includes a value indicative of time in milliseconds.

19. The system of claim 15, wherein the DL PRS muting pattern indicates a time location where one or more DL PRS resources is expected to not be transmitted for the one or more DL PRS resource sets.

20. The system of claim 15, wherein $\mu$=0, 1, 2, 3 for dl-PRS-SubcarrierSpacing=15, 30, 60 and 120 KHz respectively, and the dl-PRS-SubcarrierSpacing is a subcarrier spacing configured for the one or more DL PRS resources.

\* \* \* \* \*